United States Patent
Yeung et al.

(10) Patent No.: US 6,573,971 B1
(45) Date of Patent: Jun. 3, 2003

(54) BISTABLE TWISTED NEMATIC LCD WITHOUT AN INITIAL TWIST ANGLE OF 180 DEGREES AND NOT A MULTIPLE OF 90 DEGREES

(75) Inventors: Steven Wai Leung Yeung, Tseung Kwan (HK); Siu Kwan Kwok, Tseung Kwan (HK); Celene Chang, Tseung Kwan (HK)

(73) Assignee: Varintelligent (BVI) Limited (VG)

( * ) Notice: Subject to any disclaimer, the term of this patent is extended or adjusted under 35 U.S.C. 154(b) by 0 days.

(21) Appl. No.: 09/497,830

(22) Filed: Feb. 3, 2000

(30) Foreign Application Priority Data

| Feb. 5, 1999 | (GB) | ................................................ 9902658 |
| Feb. 8, 1999 | (GB) | ................................................ 9902763 |
| Apr. 19, 1999 | (GB) | ................................................ 9908947 |

(51) Int. Cl.$^7$ .......................... G02F 1/1335; G02F 1/13
(52) U.S. Cl. ......................... 349/177; 349/96; 349/175; 349/181
(58) Field of Search ................................. 349/177, 175, 349/181, 34, 33, 96; 345/204, 698

(56) References Cited

U.S. PATENT DOCUMENTS

| 4,529,271 A | * | 7/1985 | Berreman et al. ............. 349/34 |
| 5,488,499 A | * | 1/1996 | Tanaka et al. ............... 349/177 |
| 5,594,464 A |   | 1/1997 | Tanaka et al. ................ 345/94 |
| 6,038,001 A | * | 3/2000 | One et al. ....................... 349/33 |
| 6,320,571 B1 | * | 11/2001 | Takahashi et al. ........... 345/204 |
| 6,417,868 B1 | * | 7/2002 | Bock et al. .................. 345/698 |

OTHER PUBLICATIONS

D.W. Berreman and W.R. Heffner. New Bistable Liquid–Crystal Twist Cell, J. Appl. Phys. 52(4), Apr. 1981.
D.W. Berreman, Liquid–Crystal Twist Cell Dynamics with Backflow, J. Appl. Phys. 46(9), Sep. 1975.
Tanaka et al., A Bistable Twisted Nematic (BTN) LCD Driven by a Passive–Matrix Addressing, Proceedings of Asia Display 95.
Z.L. Xie et al., A Novel II/2 and 5 II/2 Twist Bistable TN Cell, Proceedings of SID 98.
Z.L. Xie et al., A Novel—II/2 and 3 II/2 Twist Bistable TN LCD, Proceedings of IDW 97.
Kwok H S et al.: "Optical Properties of Bistable Twisted Nematic LCD and Its Switching mechanisms" SID Conf Rec Int Display Res Conf; Proceedings of the 1997 17$^{th}$ Annual International Display Research Conference, 1997, pp. 89–92, Santa Ana.

* cited by examiner

*Primary Examiner*—Julie Ngo
(74) *Attorney, Agent, or Firm*—Blakely Sokoloff Taylor & Zafman

(57) ABSTRACT

A bistable twisted nematic LCD cell is presented. The cell includes front and rear polarizes, substrates and a liquid crystal layer between the substrates. Rubbing directions are arranged to give an initial twist angle of the liquid crystal, arranged such that the cell does not make a configuration with an initial twist angle of 180° and wherein an initial twist angle is not a multiple of 90°, and a twist angle is in the range of 30–80°, with a retardation in the range of 0.33–0.44 $\mu$m.

12 Claims, 16 Drawing Sheets

(a) Initial state  (b) Reset state  (c) High twist state  (d) Low twist state

LC Director configurations for different states

Wavelength-Transmittance plot for the -140 degree twist metastable state (40, 40(-50), 95(5), 0.38 configuration)

Wavelength-Transmittance plot for the 220 degree twist metastable state (40, 40(-50), 95(5), 0.38 configuration)

Wavelength-Transmittance plot for the -130 degree twist metastable state (50, 42(-48), 99(9), 0.39 configuration)

Wavelength-Transmittance plot for the 230 degree twist metastable state (50, 42(-48), 99(9), 0.39 configuration)

Wavelength-Transmittance plot for the -120 degree twist metastable state (60, 46(-44), 104(14), 0.39 configuration)

Wavelength-Transmittance plot for the 240 degree twist metastable state (60, 46(-44), 104(14), 0.39 configuration)

Wavelength-Transmittance plot for the -110 degree twist metastable state (70, 50(-40), 109(19), 0.39 configuration)

Wavelength-Transmittance plot for the 250 degree twist metastable state (70, 50(-40), 109(19), 0.39 configuration)

Wavelength-Transmittance plot for the -50 degree twist metastable state (13, 29(-61), 104(14), 0.28 configuration)

Wavelength-Transmittance plot for the 310 degree twist metastable state (130, 29(-61), 104(14), 0.28 configuration)

Wavelength-Transmittance plot for the -40 degree twist metastable state (140, 30(-60), 106(16), 0.28 configuration)

Wavelength-Transmittance plot for the 320 degree twist metastable state (140, 30(-60), 106(16), 0.28 configuration)

Wavelength-Transmittance plot for the -30 degree twist metastable state (150, 36(-54), 113(23), 0.27 configuration)

Wavelength-Transmittance plot for the 330 degree twist metastable state (150, 36(-54), 113(23), 0.27 configuration)

Wavelength-Transmittance plot for the -20 degree twist metastable state (160, 40(-50), 118(28), 0.27 configuration)

Wavelength-Transmittance plot for the 340 degree twist metastable state (160, 40(-50), 118(28), 0.27 configuration)

Wavelength-Transmittance plot for the -10 degree twist metastable state (170, 47(-43), 126(36), 0.27 configuration)

Wavelength-Transmittance plot for the 350 degree twist metastable state (170, 47(-43), 126(36), 0.27 configuration)

Wavelength-Transmittance plot for the 0 degree twist metastable state (180, 50(-40), 130(40), 0.27 configuration)

Wavelength-Transmittance plot for the 360 degree twist metastable state (180, 50(-40), 130(40), 0.27 configuration)

Wavelength-Transmittance plot for the 10 degree twist metastable state (190, 56(-34), 135(45), 0.27 configuration)

Wavelength-Transmittance plot for the 370 degree twist metastable state (190, 56(-34), 135(45), 0.27 configuration)

Wavelength-Transmittance plot for the 20 degree twist metastable state (200, 60(-30), 140(50), 0.28 configuration)

Wavelength-Transmittance plot for the 380 degree twist metastable state (200, 60(-30), 140(50), 0.28 configuration)

Wavelength-Transmittance plot for the 30 degree twist metastable state (210, 66(-24), 144(54), 0.30 configuration)

Wavelength-Transmittance plot for the 390 degree twist metastable state (210, 66(-24), 144(54), 0.30 configuration)

Wavelength-Transmittance plot for the 0 degree twist metastable state (180, 45(-45), 135(45), 0.27 configuration)

Wavelength-Transmittance plot for the 360 degree twist metastable state (180, 45(-45), 135(45), 0.27 configuration)

BISTABLE TWISTED NEMATIC LCD WITHOUT AN INITIAL TWIST ANGLE OF 180 DEGREES AND NOT A MULTIPLE OF 90 DEGREES

BACKGROUND OF THE INVENTION

1. Field of the Invention

The invention relates to bistable twisted nematic LCDs, and particularly to optimization of operating modes thereof.

2. Description of Related Art

Bistability of liquid crystal twist cell was first discovered by Berreman. It was not until 1995 that the first prototype Bistable Twisted Nematic (BTN) cell was demonstrated (Tanaka et. al.). The demonstrated cell was based on a π(180-degree) twist configuration. The cell gave high contrast ratio, fast response, wide viewing angle, and a high cross-talk immunity. Since then, different cell configurations have been proposed. Among them, BTN cells with 90° and 270° initial twists were proposed by Xie et al. Despite the poorer optical performance of those proposed non-180° twist cells, they have other advantages such as larger operating retardation value. All the proposed cell configurations adopt twist angles that are multiples of 90. The reason is that based on the assumption of linear crossed polarizers, the transmission is theoretically optimized at twist angles of 90° multiple. However, it is obvious that the dark state breedthrough is also important in determining the optical performance of a BTN cell. In fact, in the design of a display, instead of the bright state transmission, the contrast ratio is a more important factor to be optimized. Besides, to obtain an achromatic display, it is imperative that we take the whole visible spectrum into consideration. We observe that the performance of BTN cells can be further enhanced if the assumption of cross polarizers is removed.

Using two definitions of contrast ratios (one favours cells with high transmission while the other favours cells with low breed-through) as objective functions, optimized cell configurations covering two ranges of twist angles are proposed. The lower-twisted group offers higher retardation that relaxes the small cell gap requirement. Adopting larger cell gaps eases the manufacturing process and results in a better cell gap control. Hence, the ratio of cell gap to helical pitch (d/p), which determines the stability of the BTN select states, can be better controlled. The higher-twisted group outperforms the existing BTN configurations with less dark state breed-through. Cells with the proposed configurations are fabricated. They show excellent optical performance, with high contrast, wide viewing angle, and achromatic appearance.

It is an object of the invention to seek to provide a BTN cell of enhanced performance.

BRIEF SUMMARY OF THE INVENTION

According to the invention there is provided a bistable twisted nematic LCD cell, comprising front and rear polarizers and a liquid crystal layer having an initial twist angle, wherein the cell does not have a configuration with a twist angle of 180 degrees and an angle between the polarizers of 90 degrees.

BRIEF DESCRIPTION OF THE DRAWINGS

The LCD cell may have an initial twist angle which is not a multiple of 90 degrees, and/or may have an angle between the polarizers which is not 90 degrees.

Characteristics of BTN LCD operation and a liquid crystal cell embodying the invention are hereinafter described, by way of example, with reference to the accompanying drawings.

DETAILED DESCRIPTION OF THE INVENTION

Figure 1:
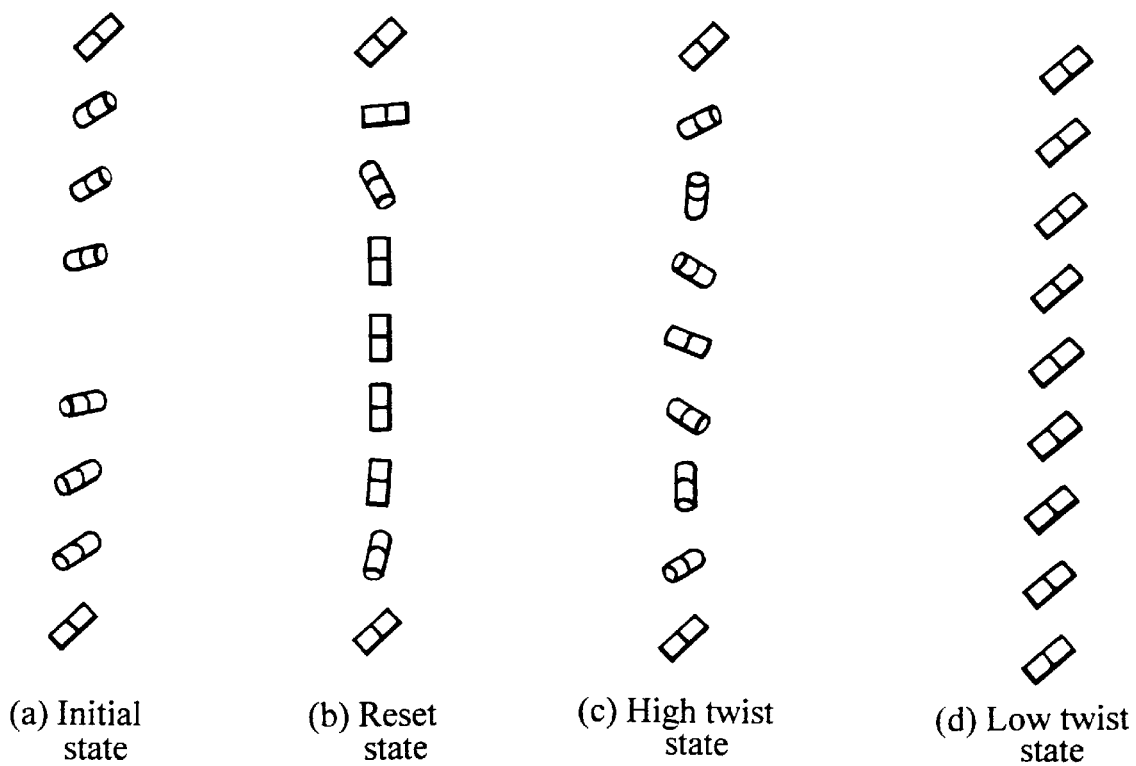
FIG. 1 shows schematically LC Director configurations for different states.

The structure of a BTN cell is similar to that of a conventional Twisted Nematic (TN) or Super Twisted Nematic (STN) cell, except that the substrates are rubbed in favour of the two selected states instead of the initial twist state (FIG. 1a). If Ø is the twist angle (in degrees) of the initial state, by applying a suitable waveform, it is possible to switch the cell to two metastable twist states, namely, Ø−180° and Ø+180° states. From various studies on BTN, it is known that the d/p ratio (d is the cell gap and p is the helical pitch) is critical in achieving practical memory retention times of the selected metastable states.

Practical memory retention times can be achieved when:

$$\frac{0.8\phi}{360} \le d/p \le \frac{1.4\phi}{360}$$

If a sufficiently high voltage is applied to a BTN cell, Frederick's transition occurs that results in vertical alignment of mid-plane liquid crystal molecules (i.e., reset state, FIG. 1b). Depending on the voltage level applied after the reset state, it is possible to relax the cell to either one of the two metastable states. If the voltage level is below a threshold, the Ø+180° twist state (FIG. 1c) is obtained. On the other hand, if the voltage level is above some saturation value, the Ø−180° twist state (FIG. 1d) is obtained. The two metastable states correspond respectively to the optical bright and dark states of the display. By optimizing the cell parameters, BTN of excellent optical performance can be obtained.

Figure 2:
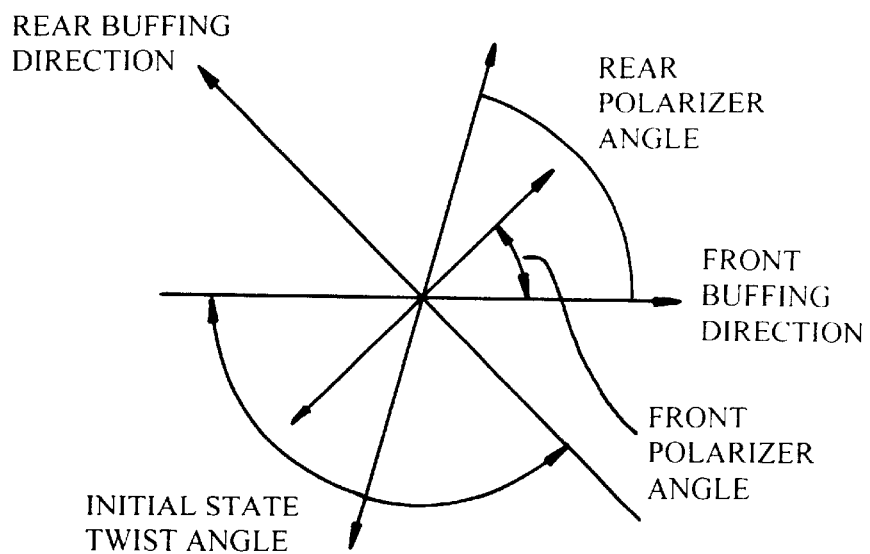
FIG. 2 shows schematically a BTN cell configuration.
Figure 3:
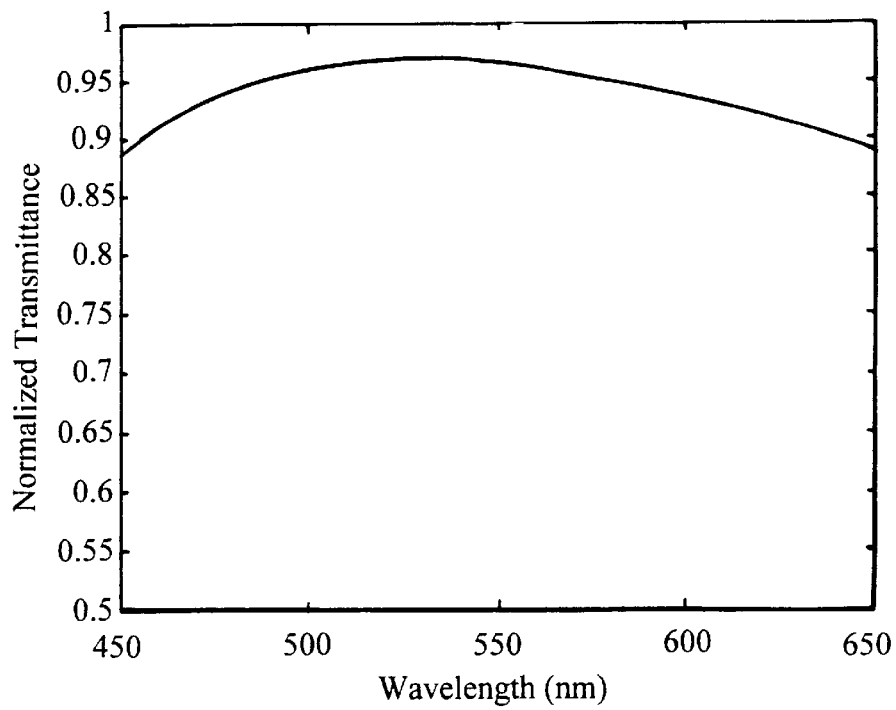
FIGS. 3 to 10 show graphically wavelength-transmission plots of bright and dark metastable states.
Figure 4:
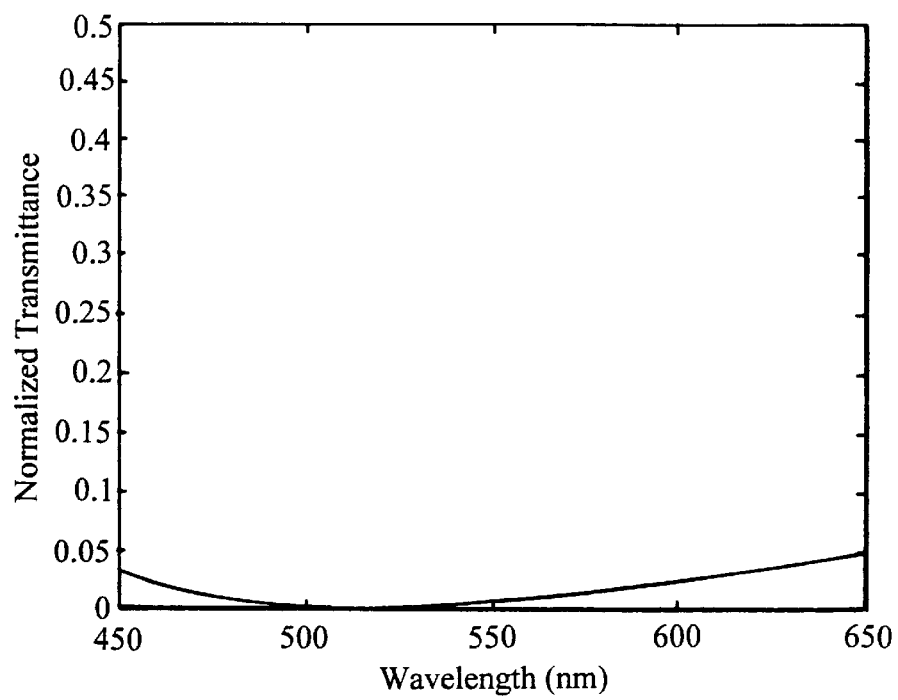
Figure 5:
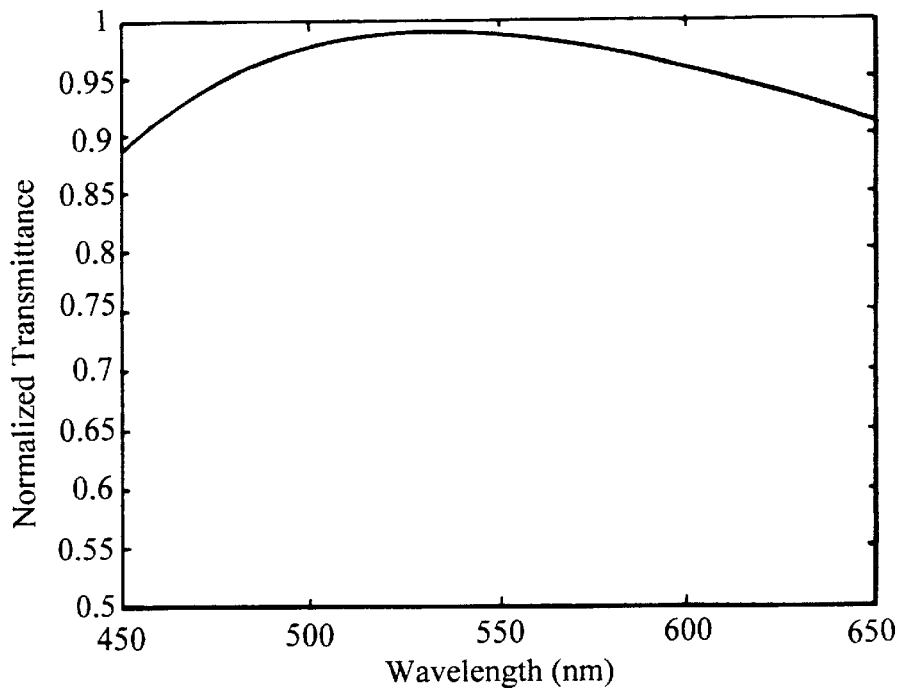
Figure 6:
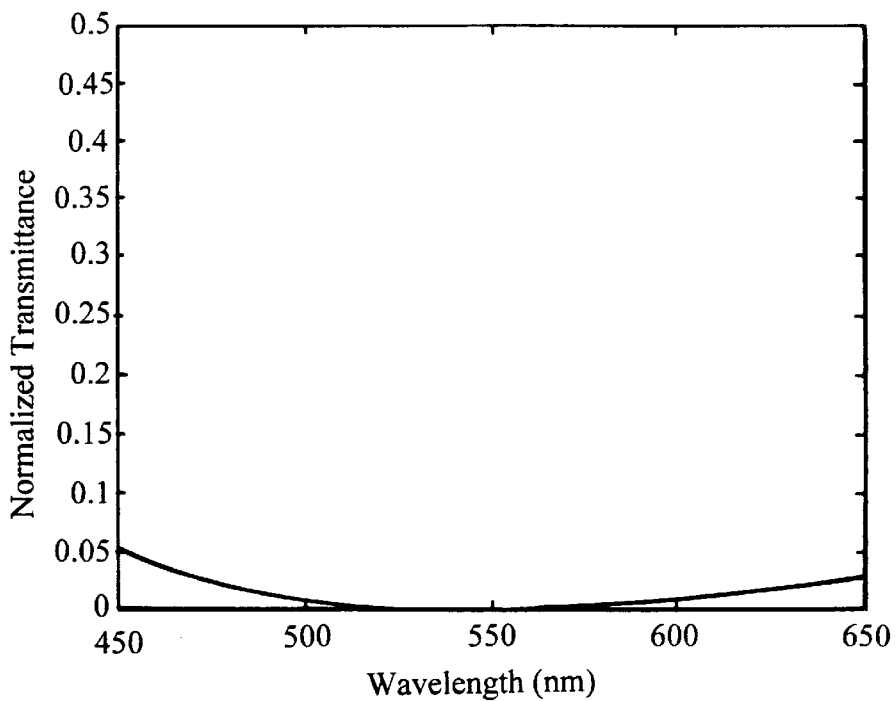
Figure 7:
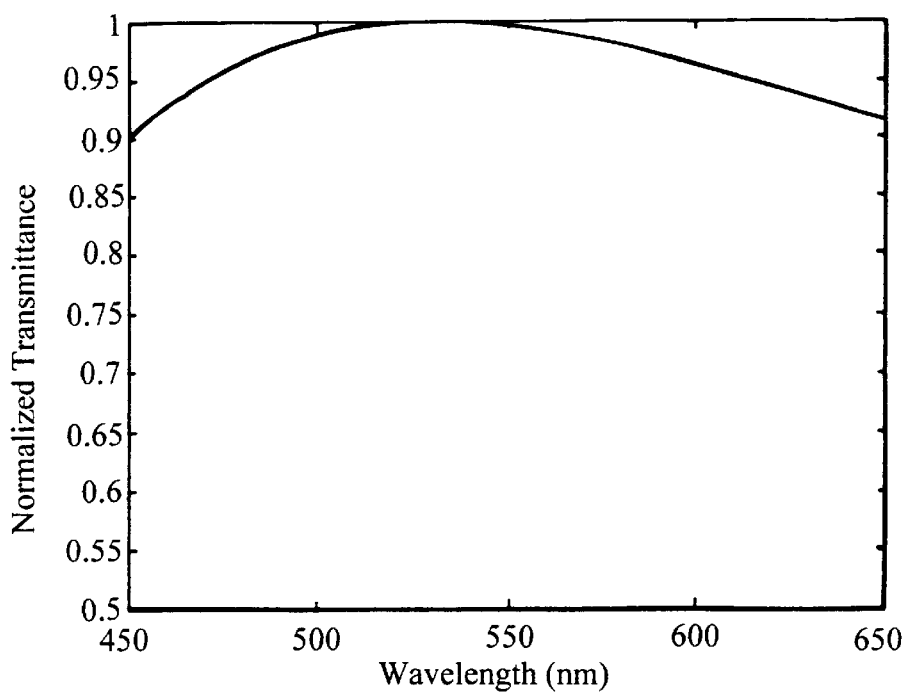
Figure 8:
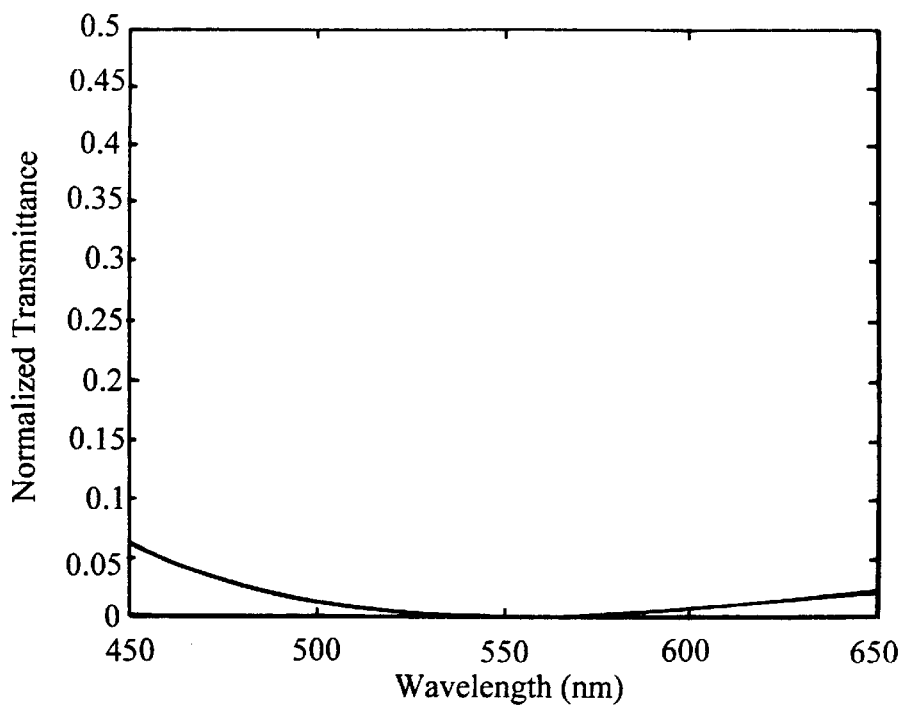
Figure 9:
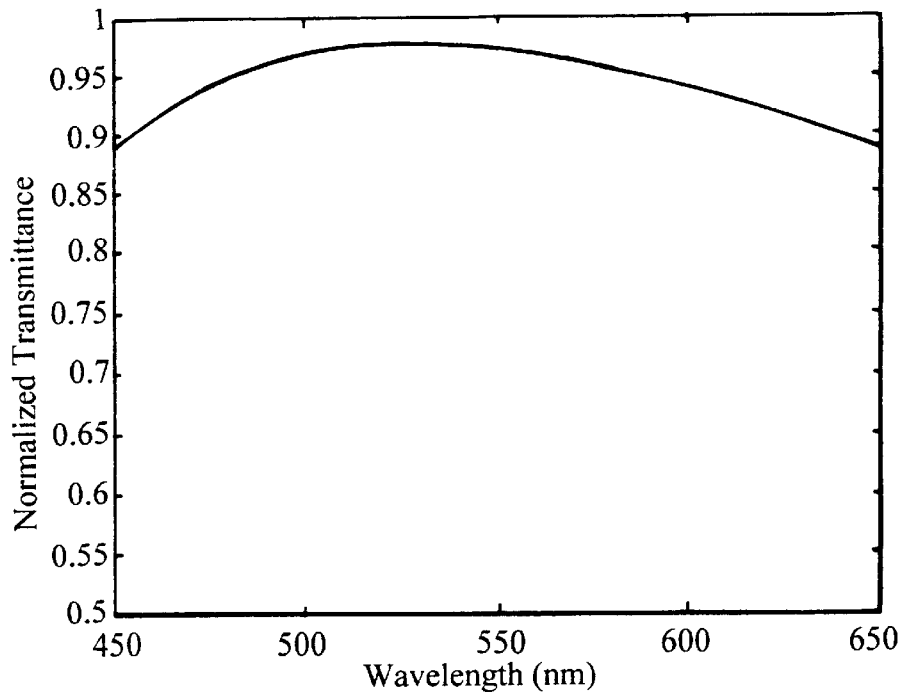
Figure 10:
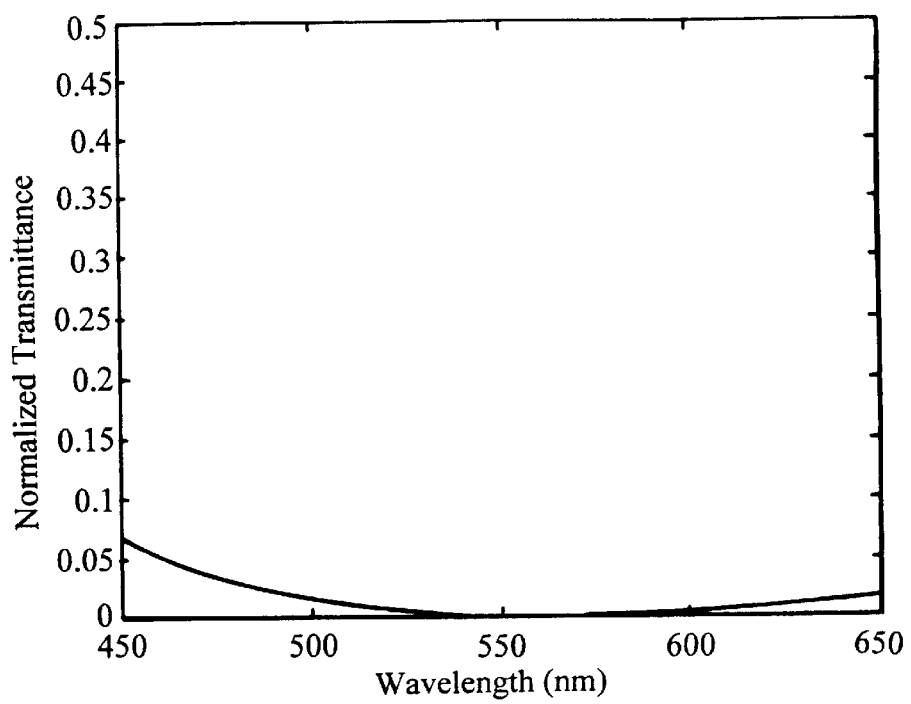
Figure 11:
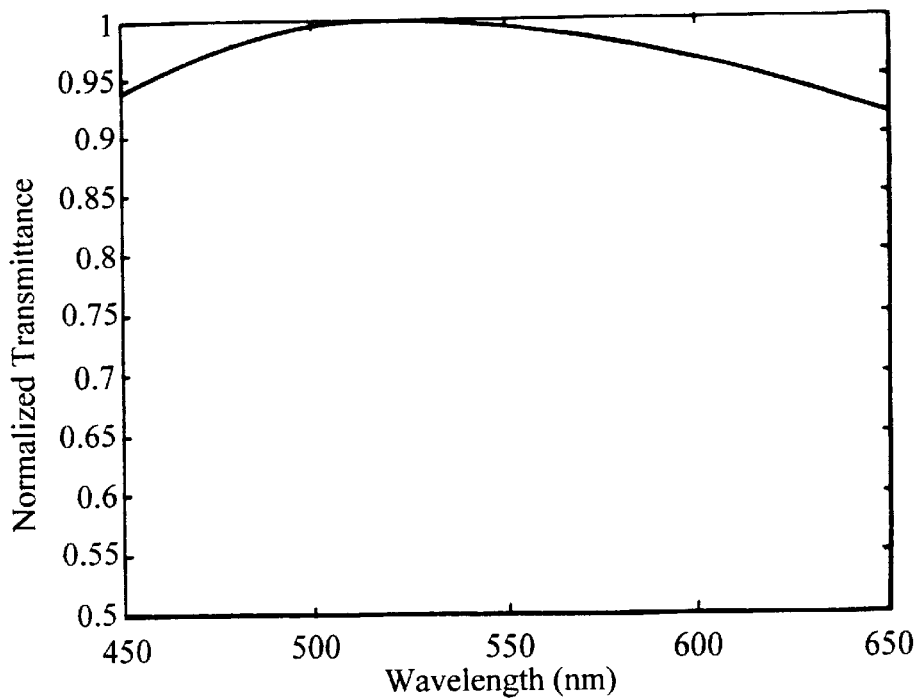
FIGS. 11 to 28 show graphically further wavelength-transmission plots of bright and dark metastable states.
Figure 12:
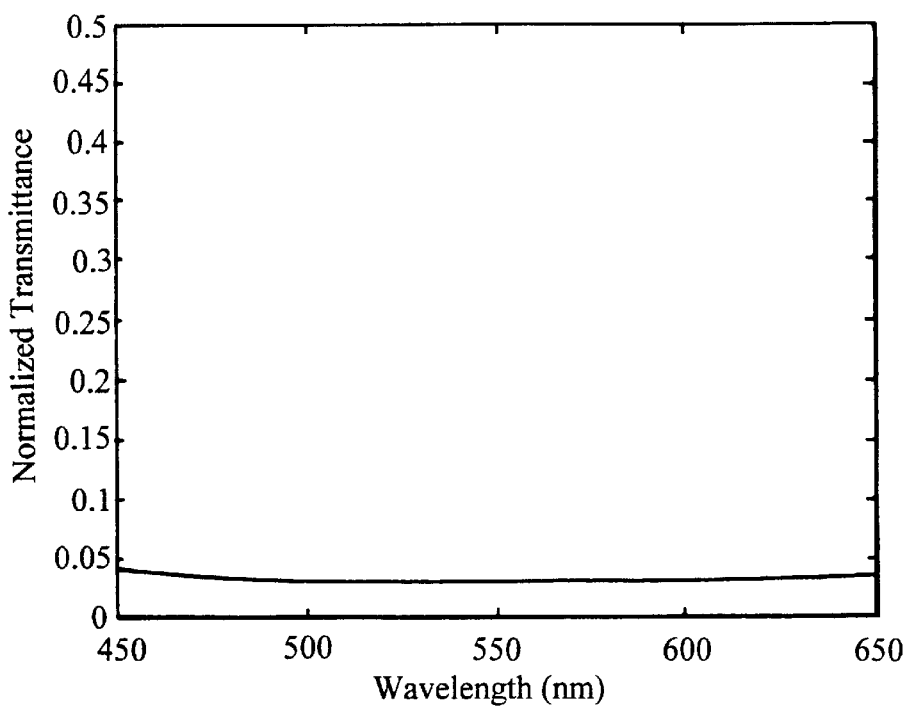
Figure 13:
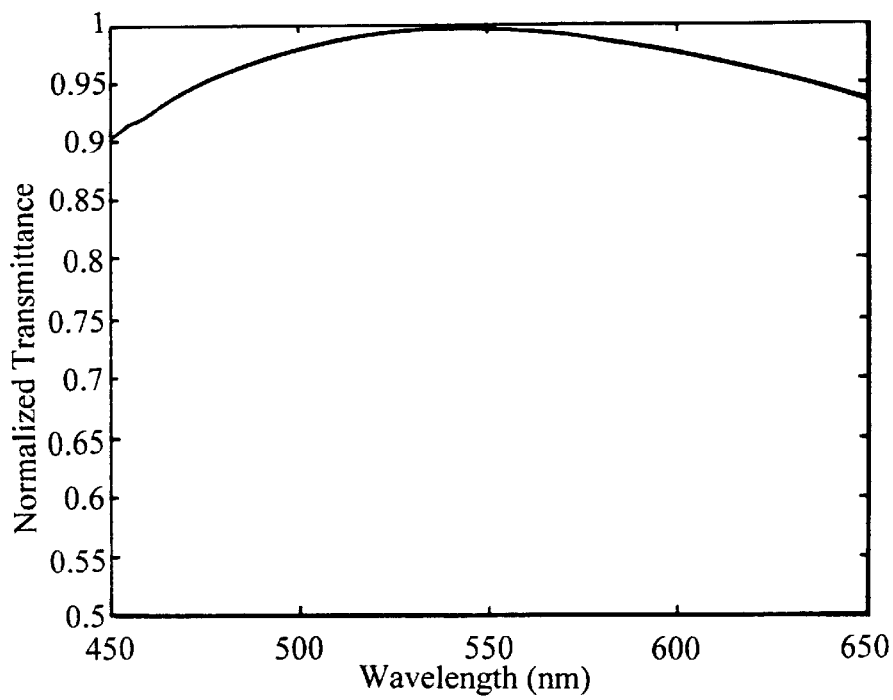
Figure 14:
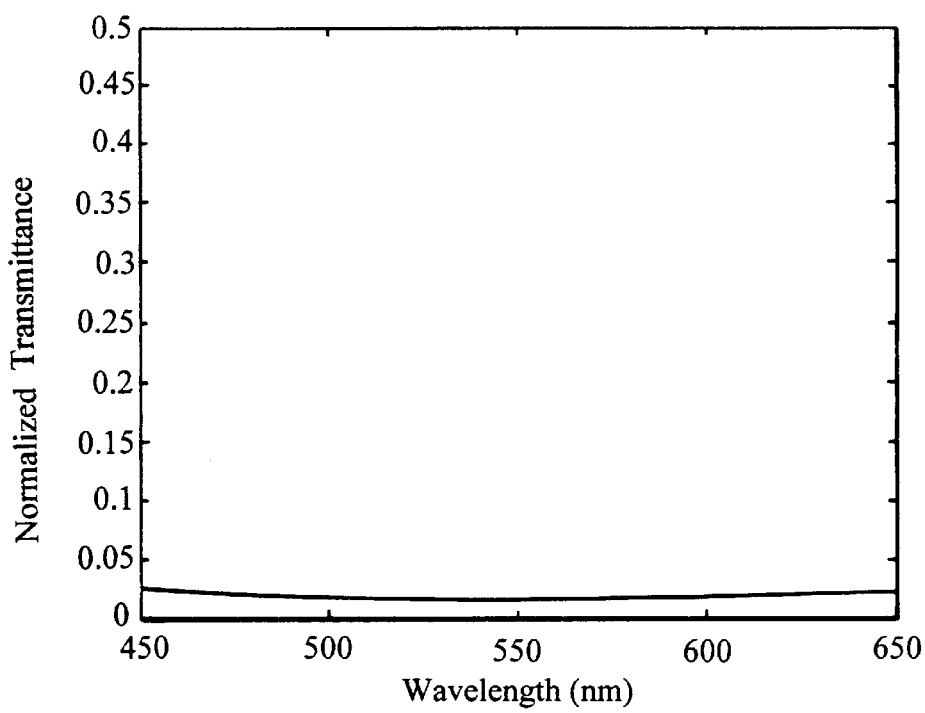
Figure 15:
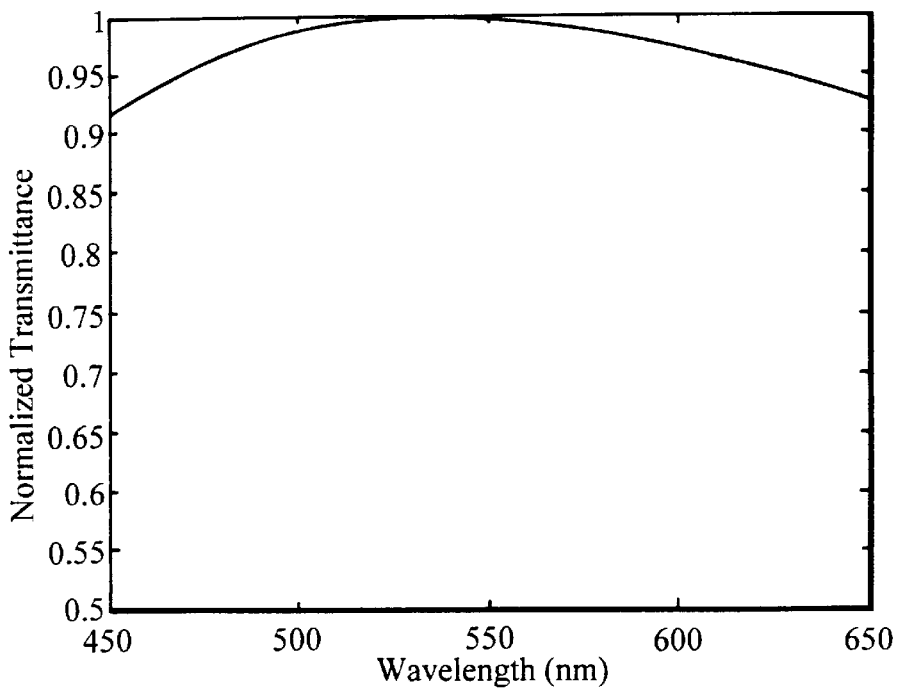
Figure 16:
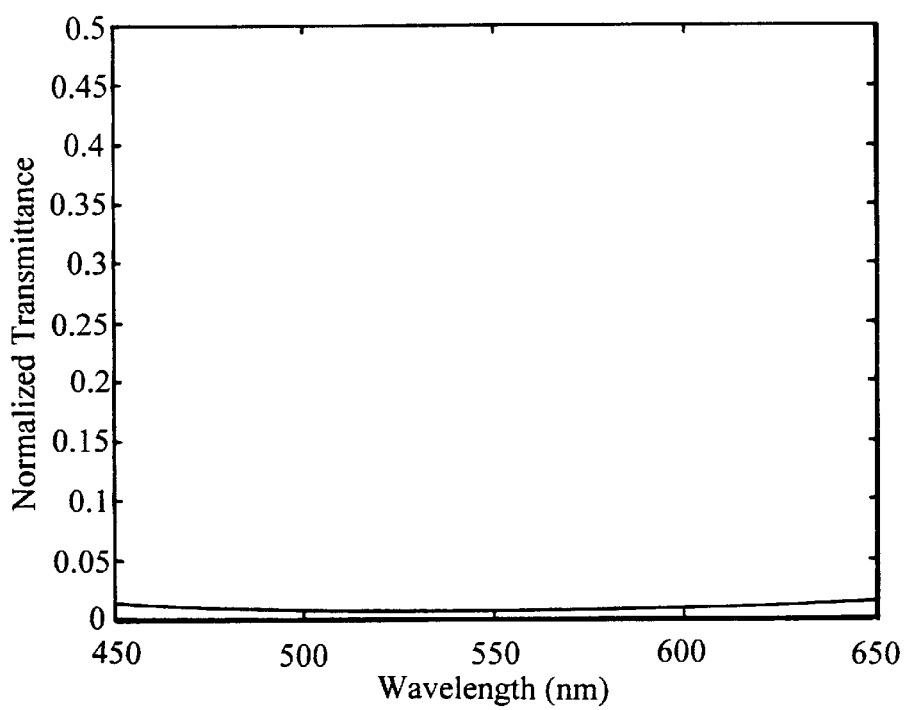
Figure 17:
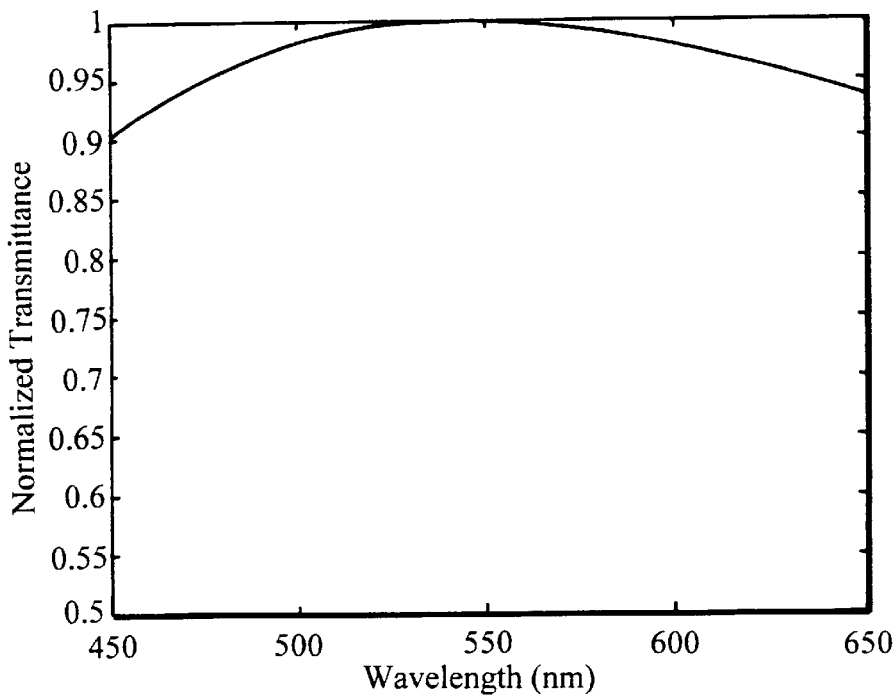
Figure 18:
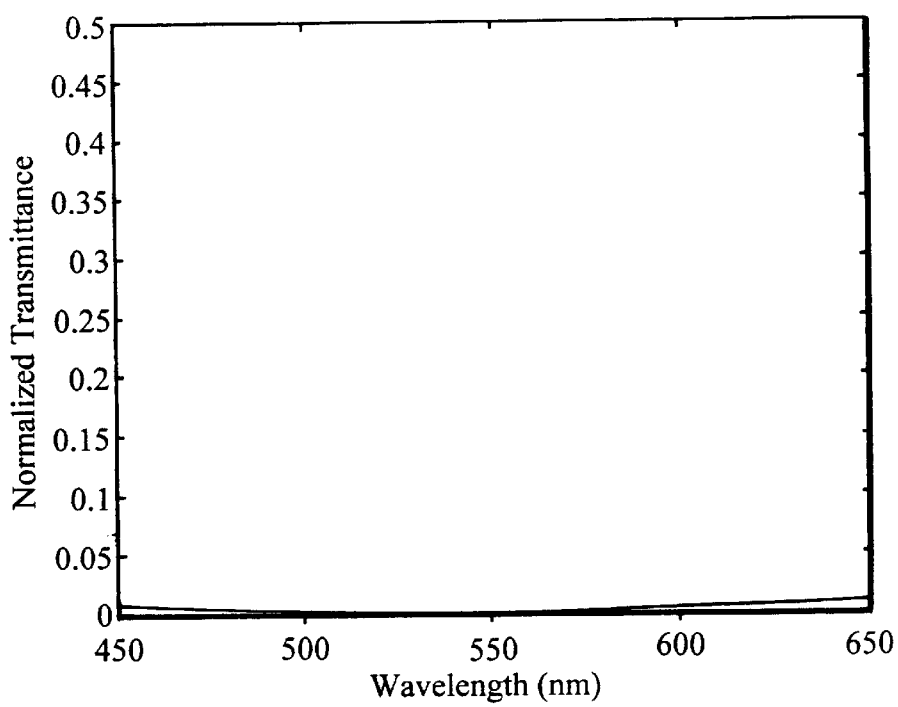
Figure 19:
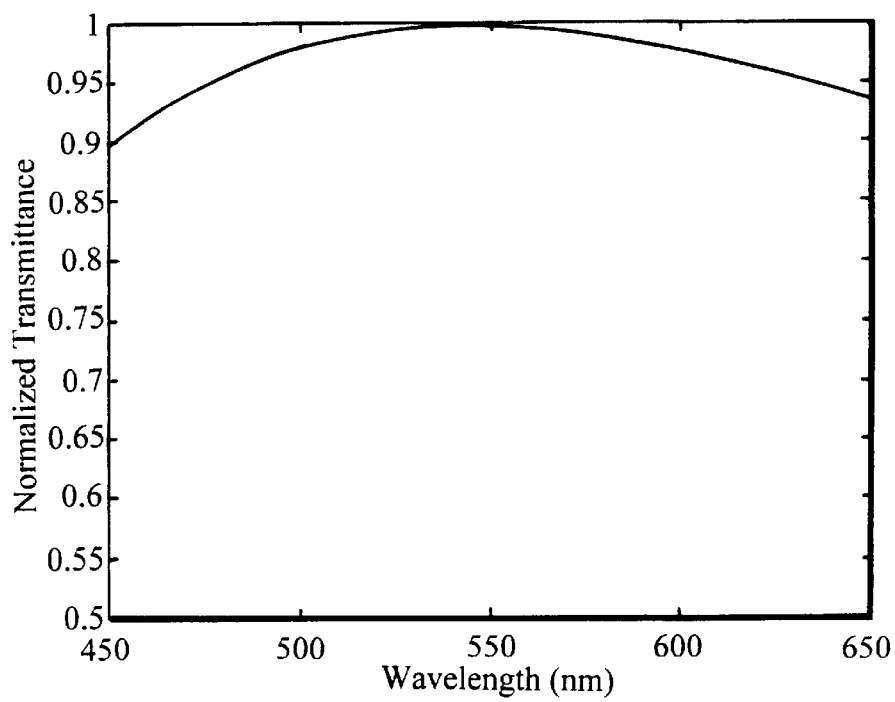
Figure 20:
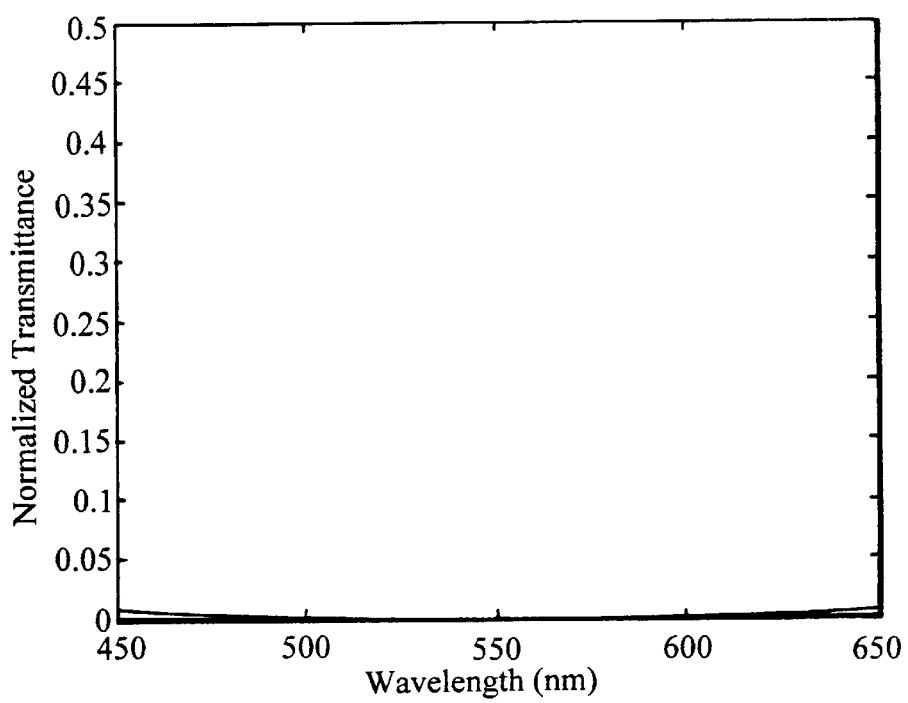
Figure 21:
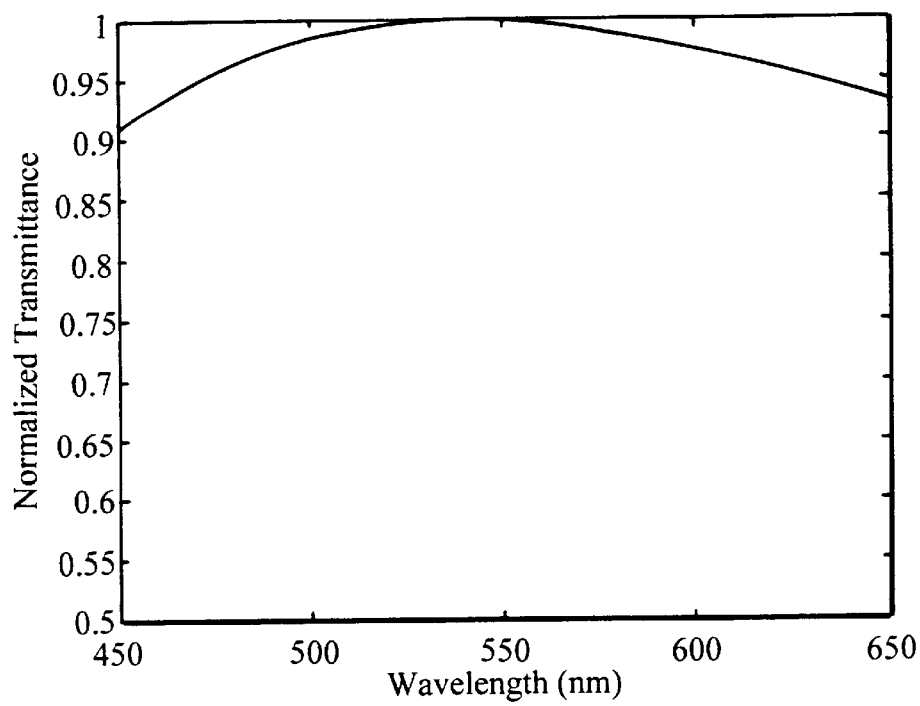
Figure 22:
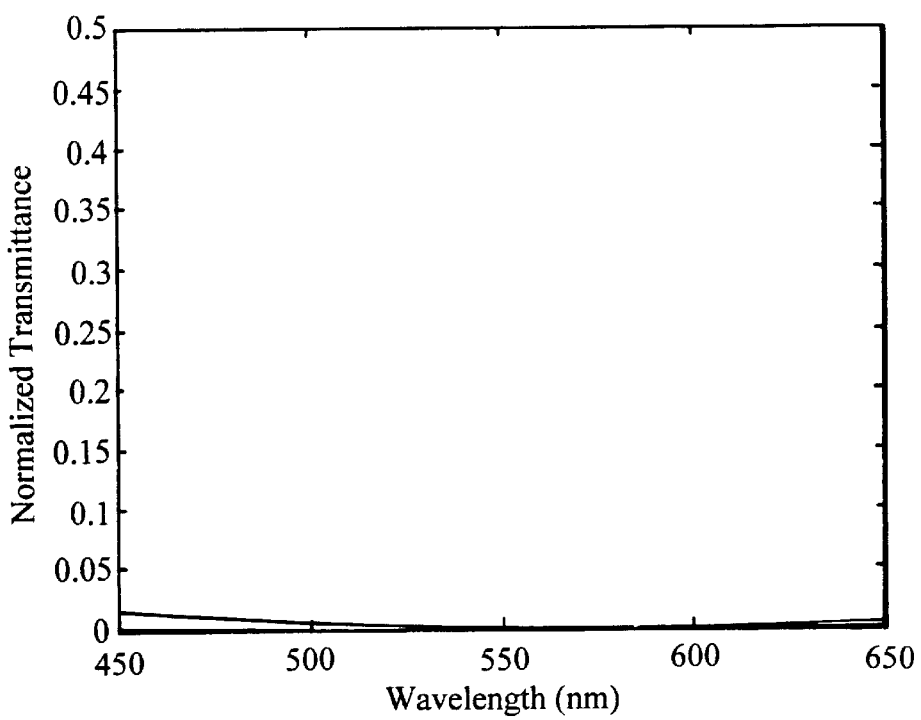
Figure 23:
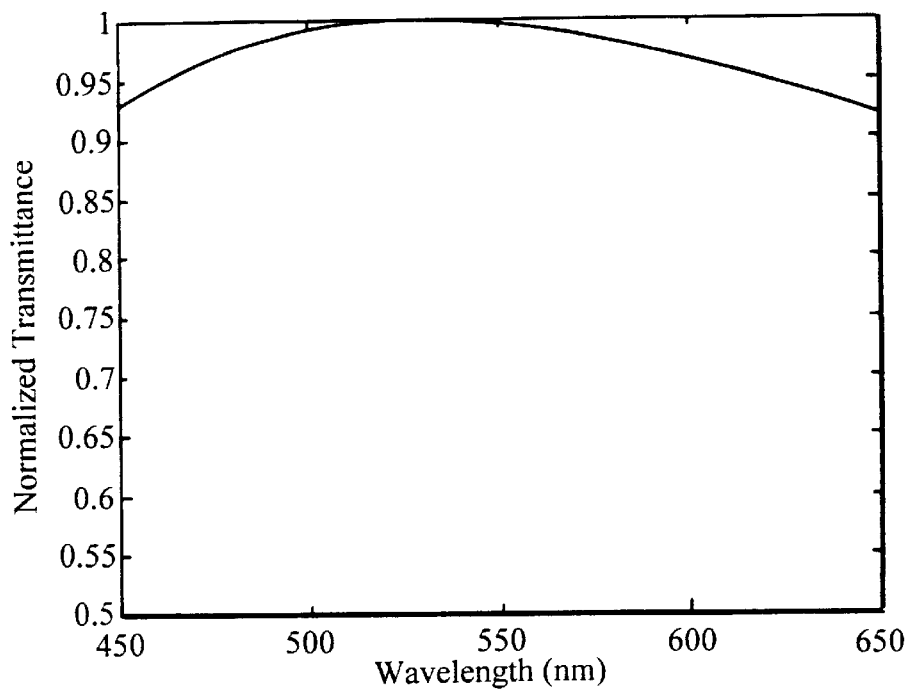
Figure 24:
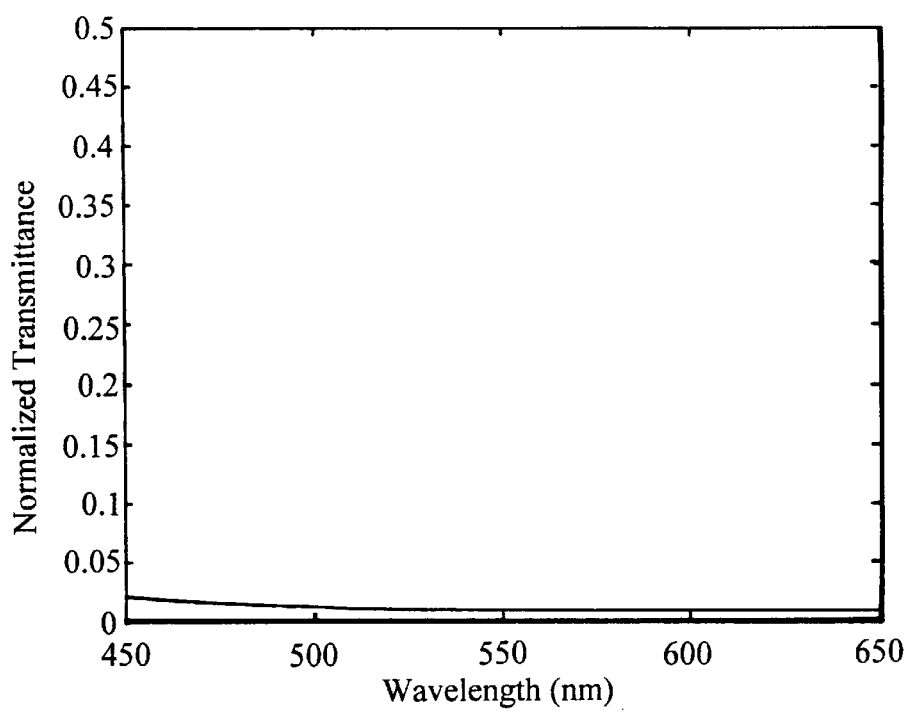
Figure 25:
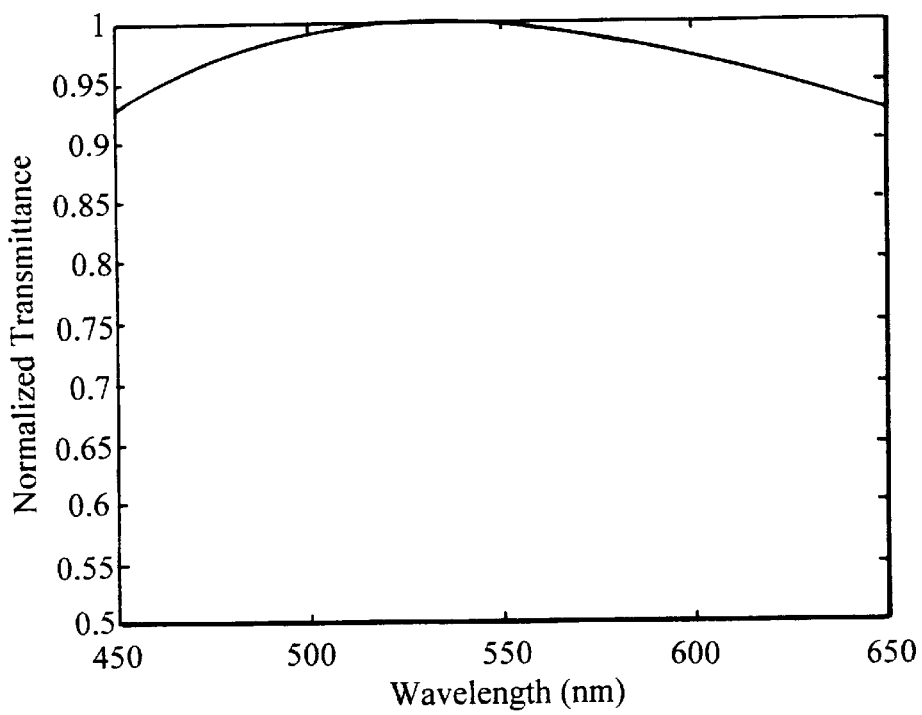
Figure 26:
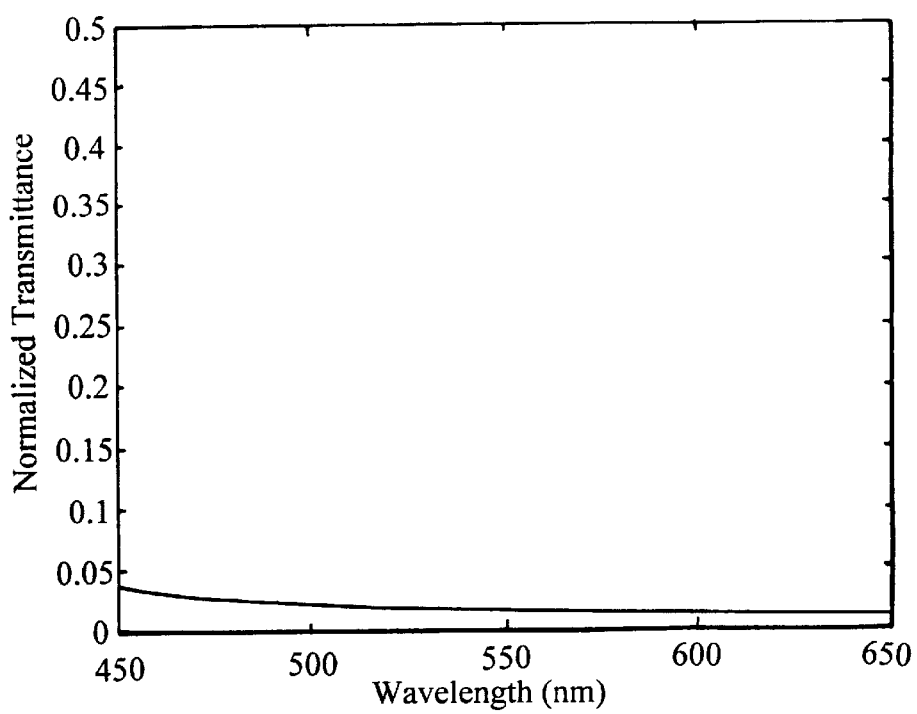
Figure 27:
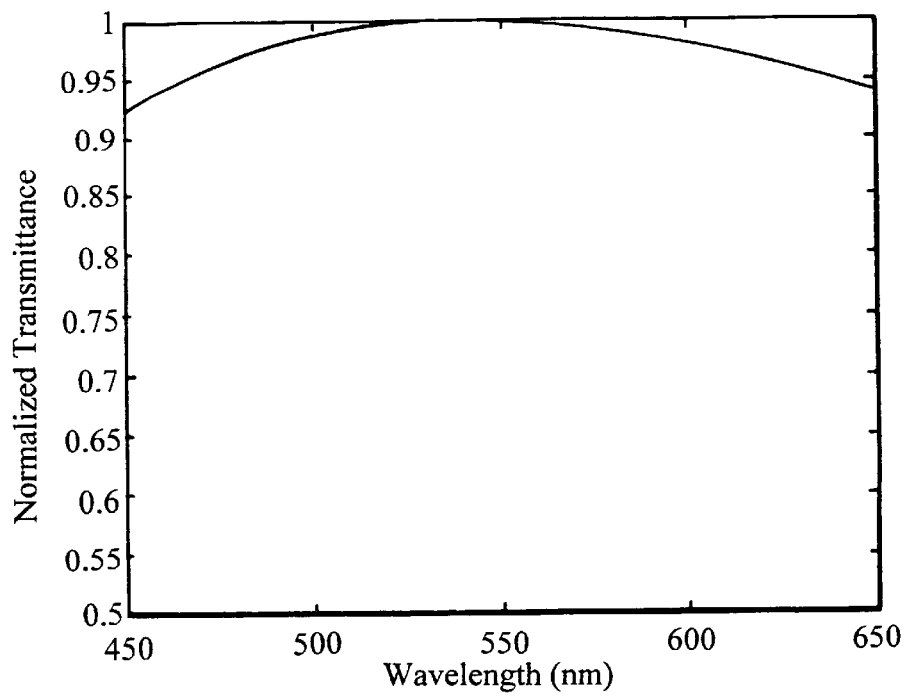
Figure 28:
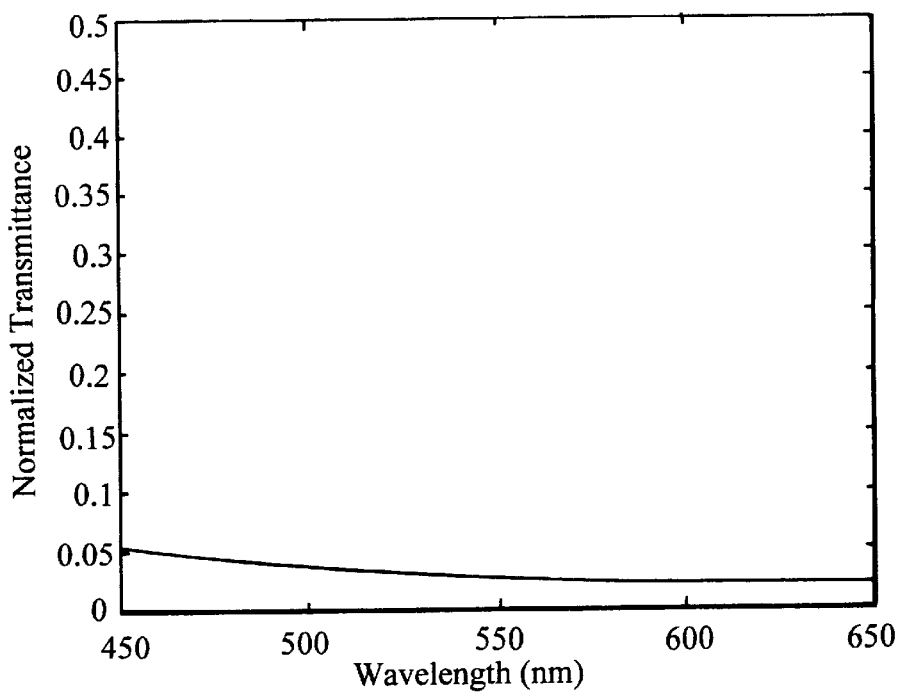

FIG. 2 shows a BTN cell configuration. Four parameters, the initial state twist angle Ø (in degrees), the front polarizer angle α (in degrees), the rear polarizer angle β (in degrees), and the cell retardation dΔn (in micrometers) are to be optimized to achieve high contrast, wide viewing angle, and achromatic appearance of the display. Hereinafter a cell configuration is abbreviated and denoted by Ø, α, β, dΔN (in micrometers). To achieve high contrast of the display, two definitions of contrast ratios are adopted. The first favours the bright state and the second favours the dark state.

The bright state can be termed $CR_1$, and the dark state $CR_2$.

Making use of the two objective functions $CR_1$, and $CR_2$ simultaneously, a cell configuration may be assessed by both its bright and dark states. At different initial state twist angles, the polarizer angles and the cell retardation are
} varied to achieve optimal configurations with high $CR_1$ and $CR_2$. Two ranges of initial twist angles within which optimal configurations are located are used. The lower-twisted group offers higher retardation values, hence less stringent cell gap control requirement. Configurations with good optical performance can be found when the twist angle is located in the range 30°–80°, with front polarizer in the range 30°–60°, rear polarizer angle in the range 85°–119° and retardation in the range 0.33 μm–0.44 μm. The four representative candidates for the group are as follows (Table 1):

TABLE 1

Lower-twisted optimized configurations

| Twist φ | Front Polarizer Angle α | Rear Polarizer Angle β | Retardation d Δ n |
|---|---|---|---|
| 40 ± 10 | 40 ± 10 | 95 ± 10 | 0.38 ± 0.05 |
| 50 ± 10 | 42 ± 10 | 99 ± 10 | 0.39 ± 0.05 |
| 60 ± 10 | 46 ± 10 | 104 ± 10 | 0.39 ± 0.05 |
| 70 ± 10 | 50 ± 10 | 109 ± 10 | 0.39 ± 0.05 |

It is observed that for lower-twisted configurations with good optical performance, the two polarizers make an angle of approximately 45°–69° with one another.

By rotating the two polarizers together by 90°, the optical performance at normal viewing direction is not changed while the transmission and chromatics at oblique viewing directions are changed to some extent.

The corresponding optimized configurations are shown in Table 2.

Accordingly, optimized configurations are found when the front polarizer angle is in the range −60°–−30°, with rear polarizer angle in the range 5°–29°. For configurations with good optical performance, the two polarizers make an angle of approximately 45°–69° with one another.

FIGS. 3–10 show the corresponding wavelength-transmission plots of the bright and dark metastable states.

TABLE 2

Lower-twisted optimised configurations with polarizers rotated by 90°.

| Twist φ | Front Polarizer Angle α | Rear Polarizer Angle β | Retardation d Δ n |
|---|---|---|---|
| 40 ± 10 | −50 ± 10 | 5 ± 10 | 0.38 ± 0.05 |
| 50 ± 10 | −48 ± 10 | 9 ± 10 | 0.39 ± 0.05 |
| 60 ± 10 | −44 ± 10 | 14 ± 10 | 0.39 ± 0.05 |
| 70 ± 10 | −40 ± 10 | 19 ± 10 | 0.39 ± 0.05 |

On the other hand, the higher-twisted group offers excellent optical performance with high $CR_1$ and $CR_2$, which outperforms the existing BTN configurations. Configurations with good optical performance can be found when the twist angle is located in the range 120°–220°, with front polarizer angle in the range 19°–76°, rear polarizer angle in the range 94°–154°, and retardation in the range 0.22–0.35. The nine representative candidates for the group are as follows (Table 3)

TABLE 3

Higher-twisted optimized configurations

| Twist φ | Front Polarizer Angle α | Rear Polarizer Angle β | Retardation d Δ n |
|---|---|---|---|
| 130 ± 10 | 29 ± 10 | 104 ± 10 | 0.23 ± 0.05 |
| 140 ± 10 | 30 ± 10 | 106 ± 10 | 0.28 ± 0.05 |
| 150 ± 10 | 36 ± 10 | 113 ± 10 | 0.27 ± 0.05 |
| 160 ± 10 | 40 ± 10 | 118 ± 10 | 0.27 ± 0.05 |
| 170 ± 10 | 47 ± 10 | 126 ± 10 | 0.27 ± 0.05 |
| 180 ± 10 | 50 ± 10 | 130 ± 10 | 0.27 ± 0.05 |
| 190 ± 10 | 56 ± 10 | 135 ± 10 | 0.27 ± 0.05 |
| 200 ± 10 | 60 ± 10 | 140 ± 10 | 0.28 ± 0.05 |
| 210 ± 10 | 66 ± 10 | 144 ± 10 | 0.30 ± 0.05 |

It is observed that for higher-twisted configurations with good optical performance, the two polarizers make an angle of approximately 65°–90° with one another. Similar to the lower-twisted case, by rotating the two polarizers together by 90°, the optical performance at normal viewing direction is not changed while the transmission and chromatics at oblique viewing directions are changed to some extent. Accordingly, optimized configurations are found when the front polarizer angles is in the range −71°–−14°, with rear polarizer angle in the range 4°–64°. For configurations with good optical performance, the two polarizers make an angle of approximately 65°–90° with one another. The corresponding optimized configurations are shown in Table 4.

TABLE 4

Higher-twisted optimized configurations with polarizers rotated by 90°

| Twist φ | Front Polarizer Angle α | Rear Polarizer Angle β | Retardation d Δ n |
|---|---|---|---|
| 130 ± 10 | −61 ± 10 | 14 ± 10 | 0.28 ± 0.05 |
| 140 ± 10 | −60 ± 10 | 16 ± 10 | 0.28 ± 0.05 |
| 150 ± 10 | −54 ± 10 | 23 ± 10 | 0.27 ± 0.05 |
| 160 ± 10 | −50 ± 10 | 28 ± 10 | 0.27 ± 0.05 |
| 170 ± 10 | −43 ± 10 | 36 ± 10 | 0.27 ± 0.05 |
| 180 ± 10 | −40 ± 10 | 40 ± 10 | 0.27 ± 0.05 |
| 190 ± 10 | −34 ± 10 | 45 ± 10 | 0.27 ± 0.05 |
| 200 ± 10 | −30 ± 10 | 50 ± 10 | 0.28 ± 0.05 |
| 210 ± 10 | −24 ± 10 | 54 ± 10 | 0.30 ± 0.05 |

Figure 29:
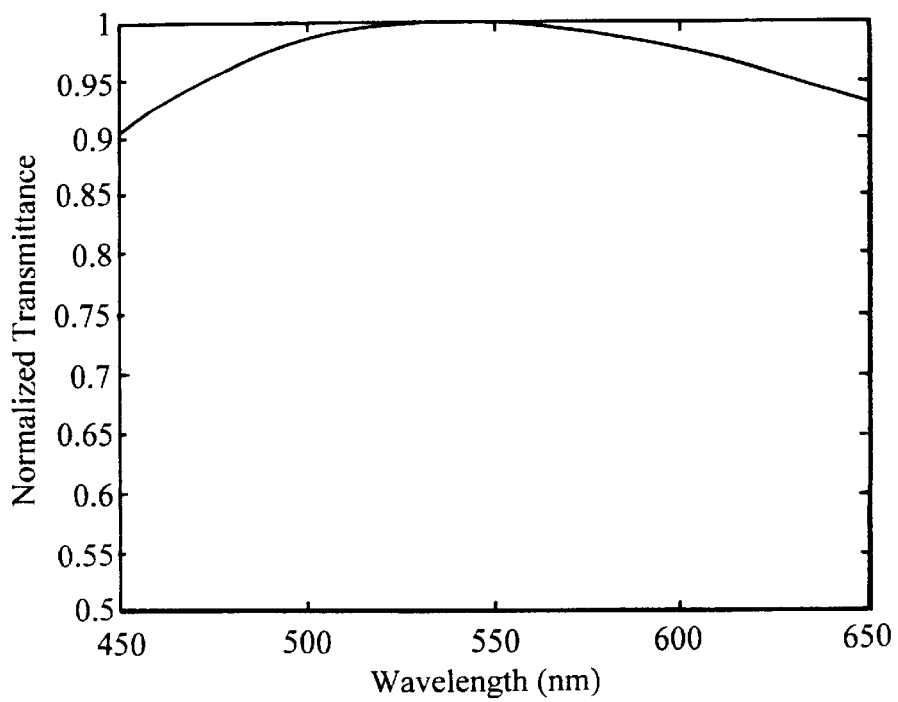
FIGS. 29 and 30 show graphically wavelength-transmission plots of known BTN LCD cells.
Figure 30:
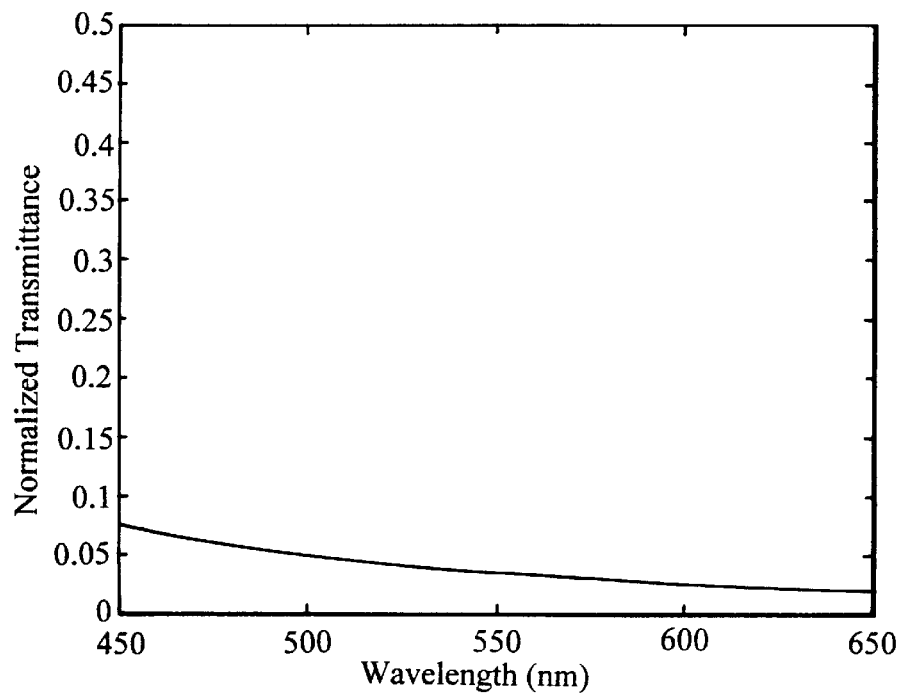

FIGS. 11–28 show the corresponding wavelength-transmission plots of the bright and dark metastable states. For comparison, FIGS. 29–30 show the wavelength-transmission plots for the originally proposed 180, −45, 45, 0.27 configuration. Table 5 summaries the optimum configurations with the contrast ratios $CR_1$ and $CR_2$. It is observed that all the proposed higher-twisted configurations have better dark state performance (higher $CR_2$) than that of the originally proposed π-twisted configuration with crossed polarizers ($CR_1$=33.65 and $CR_2$=25.31).

TABLE 5

Optimized cell configurations

| Twist | Front Polarizer Angle | Rear Polarizer Angle | Retardation | Contrast Ratio $CR_1$ | Contrast Ratio $CR_2$ |
|---|---|---|---|---|---|
| 40 | 40 | 95 | 0.38 | 16.52 | 53.90 |
| 50 | 42 | 99 | 0.39 | 25.23 | 68.63 |
| 60 | 46 | 104 | 0.39 | 29.41 | 68.02 |

TABLE 5-continued

Optimized cell configurations

| Twist | Front Polarizer Angle | Rear Polarizer Angle | Retardation | Contrast Ratio $CR_1$ | Contrast Ratio $CR_2$ |
|---|---|---|---|---|---|
| 70 | 50 | 109 | 0.39 | 18.06 | 64.29 |
| 130 | 29 | 104 | 0.28 | 34.67 | 31.29 |
| 140 | 30 | 106 | 0.28 | 32.54 | 54.41 |
| 150 | 36 | 113 | 0.27 | 36.49 | 115.14 |
| 160 | 40 | 118 | 0.27 | 34.64 | 303.36 |
| 170 | 47 | 126 | 0.27 | 32.55 | 510.94 |
| 180 | 50 | 130 | 0.27 | 35.93 | 235.37 |
| 190 | 56 | 135 | 0.27 | 35.66 | 108.43 |
| 200 | 60 | 140 | 0.28 | 36.98 | 56.14 |
| 210 | 66 | 144 | 0.30 | 39.71 | 31.84 |

Thus, using two definitions of contrast ratios (one favour cells with high transmission while the other favours cells with low breed-through) as objective functions, optimized cell configurations covering two ranges of twist angles are obtained. The lower-twisted group offers higher retardation that relaxes the small cell gap requirement. Adopting larger cell gaps eases the manufacturing process and results in a better cell gap control. Hence, the ratio of cell gap to helical pitch (d/p), which determines the stability of the BTN select states, can be better controlled in a BTN LCD according to the invention. The higher-twisted group outperforms the existing BTN configurations with less dark state breed-through. Cells with the proposed configurations show excellent optical performance, with high contrast, wide viewing angle, and achromatic appearance.

Figure 31:
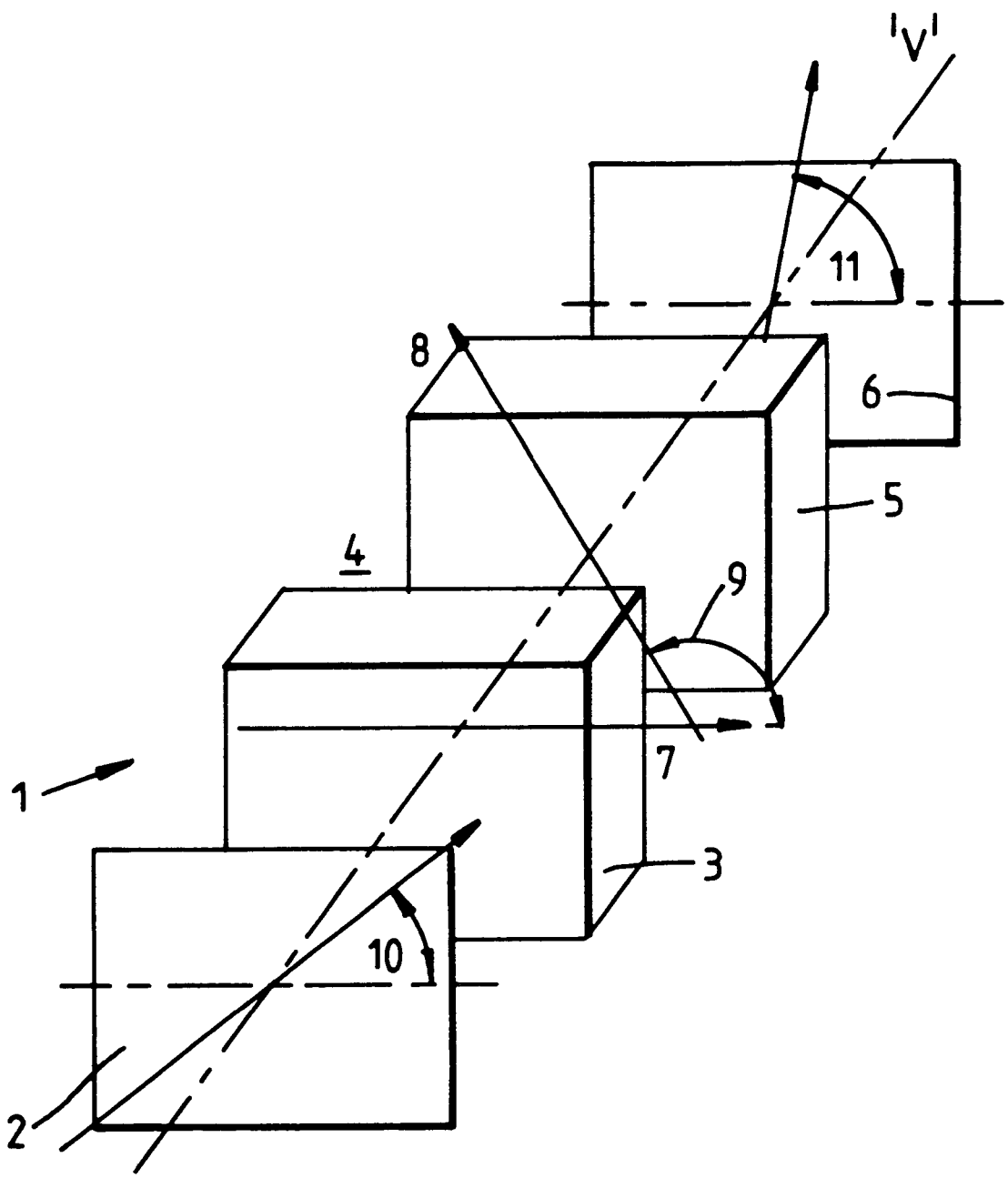
FIG. 31 shows an exploded perspective view of a liquid crystal cell according to the invention.

The cell 1 illustrated in FIG. 31 has a front (as viewed) polariser 2, a front (as viewed) substrate 3, a liquid crystal layer 4 between the front substrate and a rear (as viewed) substrate 5, and a rear (as viewed) polariser 6.

The front buffing direction is indicated at 7 and the rear buffing direction at 8, to provide the required rubbed alignment.

The substrates 3 and 5 may be of any suitable material such as plastic and include a transparent thin film coated on both sides of the inner faces of the substrates to provide electrical voltage to switch the electrical layers to other bistable states. The thin film may be of indium tin oxide (ITO) or other suitable material.

An initial twist angle is indicated at 9 and the front and rear polariser angles are indicated at 10 and 11 respectively.

The direction of view is shown at 'V'.

To summarise:
(1) Bistable Twisted Nematic LCD operating modes with non-90° multiple twist have been produced. The configurations are optimized such that they offer excellent optical performance of the display, with high contrast, wide viewing angle, and achromatic appearance.
(2) In the proposed configurations, the two polarizers make an angle differing from 90°. The polarizer angles are determined such that the two contrast ratios $CR_1$ and $CR_2$ are optimized. On the other hand, existing configurations adopt crossed polarizers which maximize the transmission for the 180° twist configuration.
(3) Applying 1 and 2 above, the optimized configurations are divided into two groups. The lower-twisted group offers higher retardation that relaxes the small cell gap requirement. Adopting larger cell gaps eases the manufacturing process and results in a better cell gap control. Hence, the ratio of cell gap to helical pitch (d/p), which determines the stability of the BTN select states, can be better controlled.
(4) Applying 1, 2 and 3 above, configurations with good optical performance can be found when the twist angle is located in the range 30°–80°, with front polarizer in the range 30°–60°, rear polarizer angle in the range 85°–119°, and retardation in the range 0.33 μm–0.44 μm.
(5) Good optical performance is maintained when the polarizer angles for the configurations stated in 4 above are rotated together by 90°, with front polarizer angle located in the range −60°–−30° and rear polarizer angle located in the range −5°–29°.
(6) For lower-twisted configurations with good optical performance as stated in 4 and 5 above, the two polarizers make an angle of approximately 45°–60° with one another.
(7) Applying 1, 2 and 3 above, among the representative lower-twisted configurations (Tables 1 and 2), the 50°–60° twist configurations give the best contrast ratios with $CR_1>25$ and $CR_2>65$.
(8) Applying 1 and 2 above, the higher-twisted group outperforms the existing BTN configurations with less dark state breed-through, hence higher contrast. The configurations result in BTN cells with wide viewing angle and achromatic appearance.
(9) Applying 1, 2 and 8 above, configurations with good optical performance can be found when the twist angle is located in the range 120°–220°, with front polarizer in the range 19°–76°, rear polarizer angle in the range 94°–154°, and retardation in the range 0.22 μm–0.35 μm.
(10) Good optical performance is maintained when the polarizer angles for the configurations stated in 9 above are rotated together by 90°, with the front polarizer angle located in the range −71°–−14° and the rear polarizer angle located in the range 4–64°.
(11) For higher-twisted configurations with good optical performance as stated in 9 and 10 above, the two polarizers make an angle of approximately 65°–90° with one another.
(12) Applying 1, 2 and 8 above, among the representative higher-twisted configurations (Tables 3 and 4), the 150°–190° twist configurations give the best contrast ratios with $CR_1>32$ and $CR_2>100$.

We claim:

1. A Bistable Twisted Nematic liquid crystal display (LCD) cell, comprising front and rear polarizers, a first substrate and a second substrate and a liquid crystal layer disposed between the first and second substrates having an initial twist angle, wherein the cell does not have a configuration with an initial twist angle of 180 degrees and is not a multiple of 90 degrees, wherein a twist angle is in the range of 30 to 80 degrees, and wherein retardation is in the range of 0.33 to 0.44 micrometers.

2. A LCD cell according to claim 1, wherein the front polarizer has an angle with respect to the surface of the first substrate in the range of 30 to 60 degrees, the rear polarizer has an angle with respect to the surface of the second substrate in the range of 85 to 119 degrees.

3. A LCD cell according to claim 1, wherein the front polarizer has an angle with respect to the surface of the first substrate in the range of −60 to −30 degrees, the rear polarizer has an angle with respect to the surface of the second substrate in the range of −5 to 29 degrees.

4. A LCD cell according to claim 1, wherein the angle between the polarizers is in the range of 45 to 69 degrees.

5. A LCD cell according to claim 4, wherein the front polarizer has an angle with respect to the surface of the first substrate in the range of −60 to −30 degrees, the rear polarizer has an angle with respect to the surface of the second substrate in the range of −5 to 29 degrees.

6. A LCD cell according to claim 4, wherein the twist angle is in the range of 50 to 60 degrees.

7. A LCD cell according to claim 1, wherein the twist angle is in the range of 50 to 60 degrees.

8. A LCD cell according to claim 1, wherein the twist angle is in the range of 120 to 220 degrees, and retardation is in the range of 0.22 to 0.35 micrometers.

9. A LCD cell according to claim 8, wherein the front polarizer has an angle with respect to the surface of the first substrate in the range of 19 to 76 degrees, the rear polarizer has an angle with respect to the surface of the second substrate in the range of 94 to 154 degrees.

10. A LCD cell according to claim 8, wherein the front polarizer has an angle with respect to the surface of the first substrate in the range of −71 to −14 degrees, the rear polarizer has an angle with respect to the surface of the second substrate in the range of 4 to 64 degrees.

11. A LCD cell according to claim 8, wherein the angle between the polarizers is in the range of 65 to 90 degrees.

12. A LCD cell according to claim 8, wherein the twist angle is in the range of 150 to 190 degrees.

* * * * *

UNITED STATES PATENT AND TRADEMARK OFFICE
CERTIFICATE OF CORRECTION

PATENT NO. : 6,573,971 B1
DATED : June 3, 2003
INVENTOR(S) : Yeung et al.

It is certified that error appears in the above-identified patent and that said Letters Patent is hereby corrected as shown below:

Column 6,
Line 56, please delete "claim 1" and insert -- claim 2 --.

Column 8,
Line 5, please delete "to 64 degrees" and insert -- to -64 degrees --.

Signed and Sealed this

Thirteenth Day of July, 2004

JON W. DUDAS
*Acting Director of the United States Patent and Trademark Office*